United States Patent
Yegin et al.

(10) Patent No.: US 9,202,055 B2
(45) Date of Patent: Dec. 1, 2015

(54) METHOD AND APPARATUS FOR PROVIDING MACHINE-TO-MACHINE SERVICE

(75) Inventors: Alper Yegin, Sariyer (TR); Youngkyo Baek, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 159 days.

(21) Appl. No.: 13/447,571

(22) Filed: Apr. 16, 2012

(65) Prior Publication Data

US 2012/0265983 A1 Oct. 18, 2012

Related U.S. Application Data

(60) Provisional application No. 61/475,972, filed on Apr. 15, 2011, provisional application No. 61/485,275, filed on May 12, 2011, provisional application No. 61/544,577, filed on Oct. 7, 2011.

(51) Int. Cl.

| H04L 29/06 | (2006.01) |
|---|---|
| G06F 21/57 | (2013.01) |
| H04W 4/00 | (2009.01) |
| H04W 12/06 | (2009.01) |
| G06F 9/44 | (2006.01) |

(52) U.S. Cl.
CPC ............ G06F 21/57 (2013.01); H04L 63/0807 (2013.01); H04W 4/001 (2013.01); H04W 4/005 (2013.01); H04W 12/06 (2013.01); G06F 9/4401 (2013.01); G06F 2221/2143 (2013.01); H04L 63/126 (2013.01); H04L 2463/061 (2013.01)

(58) Field of Classification Search
CPC .................. G06F 21/57; G06F 9/4401; G06F 2221/2143; H04L 63/08; H04L 63/0807
USPC ................. 713/152, 155, 168, 175, 170, 171; 709/229, 223–225; 705/50; 726/21, 1, 726/10, 4–7; 455/411, 435.1, 435.3
See application file for complete search history.

(56) References Cited

U.S. PATENT DOCUMENTS

| 7,181,620 | B1* | 2/2007 | Hur ................................ 713/171 |
|---|---|---|---|
| 2007/0101122 | A1* | 5/2007 | Guo ............................... 713/153 |
| 2007/0124592 | A1* | 5/2007 | Oyama .......................... 713/171 |
| 2007/0143613 | A1* | 6/2007 | Sitch et al. .................... 713/171 |
| 2007/0186108 | A1* | 8/2007 | Passarella et al. ............ 713/171 |
| 2008/0104242 | A1* | 5/2008 | Zavalkovsky et al. ........ 709/225 |
| 2008/0178277 | A1* | 7/2008 | Oba et al. ....................... 726/10 |

(Continued)

OTHER PUBLICATIONS

V. Cakulev et al, An EAP Authentication Method Based on Identity-Based Authenticated Key Exchange, pp. 1-16, Network Working Group Internet—Draft, Mar. 7, 2011.*
Josef Blanz, Example for SCL resource usage according to ETSI TC M2M, Qualcomm Inc., Mar. 2011.*

(Continued)

*Primary Examiner* — Shanto M Abedin
(74) *Attorney, Agent, or Firm* — Jefferson IP Law, LLP

(57) ABSTRACT

A method and an apparatus for providing Machine-to-Machine (M2M) service are provided. A method of providing service by an M2M device includes transmitting a request for service to a Network Security Capability (NSEC), the request for service comprising a identifier of a Device Service Capability Layer (DSCL) of the M2M device, performing an Extensible Authentication Protocol (EAP) authentication with an M2M Authentication Server (MAS) via the NSEC, and generating, if the EAP authentication is successful, a service key using a Master Session Key (MSK), a first constant string, and the identifier of the DSCL.

28 Claims, 8 Drawing Sheets

(56) References Cited

U.S. PATENT DOCUMENTS

| | | | |
|---|---|---|---|
| 2008/0195861 A1* | 8/2008 | Salomone | 713/155 |
| 2009/0205028 A1* | 8/2009 | Smeets et al. | 726/6 |
| 2009/0217348 A1* | 8/2009 | Salmela et al. | 726/2 |
| 2010/0057485 A1 | 3/2010 | Luft | |
| 2010/0100735 A1* | 4/2010 | Rajan et al. | 713/168 |
| 2011/0016321 A1 | 1/2011 | Sundaram et al. | |
| 2011/0107087 A1* | 5/2011 | Lee et al. | 713/155 |
| 2011/0154039 A1* | 6/2011 | Liu et al. | 713/170 |
| 2011/0213871 A1* | 9/2011 | DiGirolamo et al. | 709/223 |
| 2011/0307694 A1* | 12/2011 | Broustis et al. | 713/163 |
| 2012/0047551 A1* | 2/2012 | Pattar et al. | 726/1 |
| 2012/0167185 A1* | 6/2012 | Menezes et al. | 726/5 |
| 2012/0227097 A1* | 9/2012 | Nakhjiri | 726/7 |
| 2013/0188515 A1* | 7/2013 | Pinheiro et al. | 370/254 |
| 2013/0254544 A1* | 9/2013 | Hjelm et al. | 713/171 |

OTHER PUBLICATIONS

Sachin Agarwal et al, Operator-based Over-the-air M2M Wireless Sensor Network Security, IEEE, 2010.*

3GPP_TS_22.368(V102.0) Service requirements for Machine-Type Communications (MTC); Stage 1 (Release 10), Sep. 30, 2010 See paragraphs 7.2.1-7.2.6.

Machine-to-Machine communications (M2M); mla, dla and mld interfaces, Draft TS 102 921v082_revmarked_MAIN, European Telecommunications Standards Institute (ETSI) Draft, Sep. 26, 2011, XP014167572, p. 34, line 4—p. 38, line 2; figure X.

Samsung, mid Security Key and Method Negotiation; M2M(11)0755r3_mid_Security_Key_and_Method_Negotiation, European Telecommunications Standards Institute (ETSI) Draft, Oct. 25, 2011, XP014166202.

* cited by examiner

METHOD AND APPARATUS FOR PROVIDING MACHINE-TO-MACHINE SERVICE

CROSS-REFERENCE TO RELATED APPLICATIONS

This application claims the benefit under 35 U.S.C. §119 (e) of a U.S. Provisional application filed on Apr. 15, 2011 in the U.S. Patent and Trademark Office and assigned Ser. No. 61/475,972, and of a U.S. Provisional application filed on May 12, 2011 in the U.S. Patent and Trademark Office and assigned Ser. No. 61/485,275, and of a U.S. Provisional application filed on Oct. 7, 2011 in the U.S. Patent and Trademark Office and assigned Ser. No. 61/544,577, the entire disclosures of each of which are hereby incorporated by reference.

BACKGROUND OF THE INVENTION

1. Field of the Invention

The present invention relates to a method and an apparatus for a communication system. More particularly, the present invention relates to a method and apparatus for providing a Machine-to-Machine (M2M) service.

2. Description of the Related Art

The M2M industry is currently developing and defining technologies that allow M2M devices to join M2M networks in order to enable applications running on the M2M devices to communicate with applications running on various control nodes (i.e., servers) to the Internet or other similar communications networks. In order to facilitate this communication, M2M devices are expected to execute a service registration procedure with a given M2M network.

SUMMARY OF THE INVENTION

Aspects of the present invention are to address at least the above-mentioned problems and/or disadvantages and to provide at least the advantages described below.

According to an aspect of the present invention a method of providing service by a Machine-to-Machine (M2M) device is provided. The method includes transmitting a request for service to a Network Security Capability (NSEC), the request for service including an identifier of a Device Service Capability Layer (DSCL) of the M2M device, performing an Extensible Authentication Protocol (EAP) authentication with an M2M Authentication Server (MAS) via the NSEC and generating, if the EAP authentication is successful, a service key using a Master Session Key (MSK), a first constant string, and the identifier of the DSCL.

In accordance with an aspect of the present invention, a Machine-to-Machine (M2M) device for providing service is provided. The M2M device includes a transmitter for transmitting a request for service to a Network Security Capability (NSEC), the request for service including an identifier of a Device Service Capability Layer (DSCL) of the M2M device, a controller for performing an Extensible Authentication Protocol (EAP) authentication with an M2M Authentication Server (MAS) via the NSEC, and a key generator for generating, if the EAP authentication is successful, an service key using a Master Session Key (MSK), a first constant string, and the identifier of the DSCL.

In accordance with another aspect of the present invention, a method of providing service by a Network Security Capability (NSEC) in a Machine-to-Machine (M2M) system is provided. The method includes determining whether a request for service is received from an M2M device, the request for service including a identifier of a Device Service Capability Layer (DSCL) of the M2M device, performing, if the request for service is received, an Extensible Authentication Protocol (EAP) authentication with the M2M device and an M2M Authentication Server (MAS), and generating, if the EAP authentication is successful, a service key using a Master Session Key (MSK), a first constant string, and the identifier of the DSCL.

In accordance with another aspect of the present invention, a Network Security Capability (NSEC) device for providing service in a Machine-to-Machine (M2M) system is provided. The NSEC device includes a controller for determining whether a request for service is received from an M2M device, the request for service comprising a identifier of a Device Service Capability Layer (DSCL) of the M2M device, and for performing, if the request for service is received, an Extensible Authentication Protocol (EAP) authentication with the M2M device and an M2M Authentication Server (MAS), and a key generator for generating, if the authentication is successful, a service key using a Master Session Key (MSK), a first constant string, and the identifier of the DSCL.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

M2M service registration is a procedure that runs between the M2M device and a M2M core network in order to authenticate and authorize the M2M device for access to M2M services provided by the M2M core network. Alternative names may be used for M2M service registration procedure, such as M2M connect, connection, joining, or other similar words indicating an electronic device being incorporated into a communications network, in various places.

Figure 1:
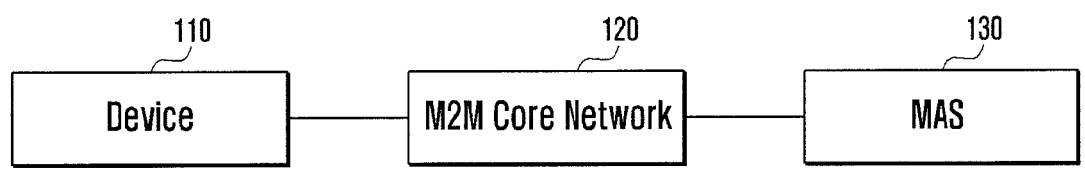
FIG. 1 depicts network elements involved in a Machine-to-Machine (M2M) service registration procedure according to an embodiment of the present invention.

FIG. 1 depicts network elements involved in a Machine-to-Machine (M2M) service registration procedure according to an embodiment of the present invention.

Referring to FIG. 1, lines connecting the network elements correspond to communication interfaces used among the network elements of an M2M network. Device 110 is an entity seeking to register in order to start using M2M facilities provided by an M2M Core Network 120. An M2M Authentication Server (MAS) 130 holds a copy of a Root Key (KR) that gets used during the authentication of the device 110 as part of the registration procedure. It is assumed that either the device 110 has gone through a bootstrap procedure, or both the device 110 and the M2M network are pre-provisioned with the KR. At the end of the registration, a session Secret Key (KS) is generated, wherein the KS is used for cryptographically securing application communication over the M2M network. The KS is stored in the M2M core network 120 and the device 110.

The European Telecommunications Standards Institute (ETSI) M2M Technical Committee (TC) is one of the standards organizations working on designing M2M standards. The ETSI M2M TC had identified a need for a registration procedure and requirements for the registration period, but has not developed a solution for the registration procedure.

Figure 2:
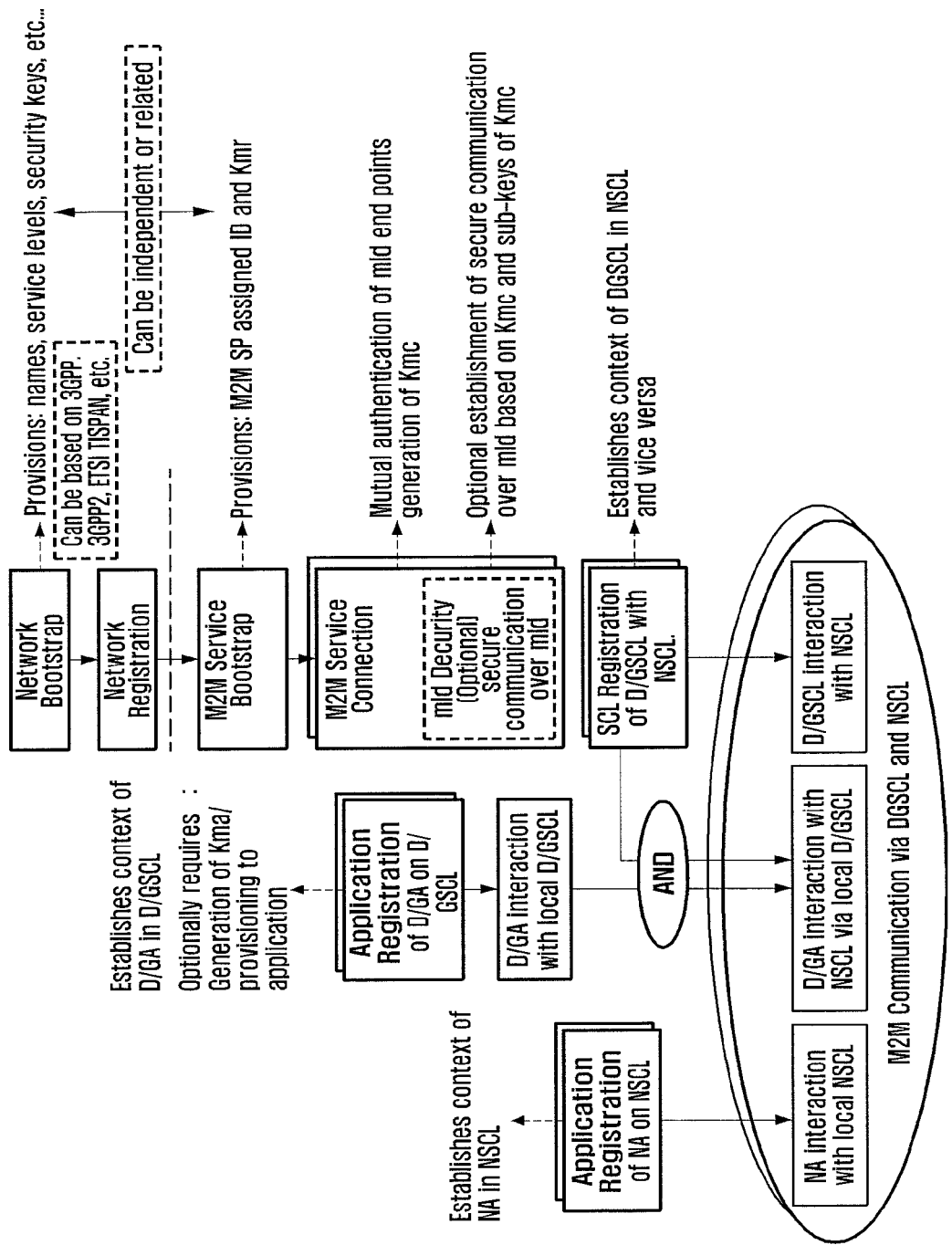
FIG. 2 depicts high-level flow of events that are used for by Machine-to-Machine (M2M) networks according to an embodiment of the present invention.

FIG. 2 depicts high-level flow of events that are used for by M2M networks according to an embodiment of the present invention.

Referring to FIG. 2 network registration, which includes network access authentication, is a procedure used by the M2M device for gaining access to the Internet or an Internet Protocol (IP) network. Higher-layer procedures, such as M2M related procedures, may be used after successful execution of the network registration procedures. M2M related procedures, such as an M2M service bootstrap and an M2M service connection, are used for gaining access to the M2M network and an overlay network on top of the IP network. What is referred to as a "M2M service connection" in FIG. 2 corresponds to what is referred to herein as the "M2M Service Registration" procedure. In FIG. 2, an M2M device contains a Device Service Capability Layer (DSCL), an M2M gateway contains a Gateway Service Capability Layer (GSCL), and an Network Domain contains a Network Service Capability Layer (NSCL). The NSCL refers to M2M Service Capabilities in the Network Domain. The GSCL refers to M2M Service Capabilities in the M2M Gateway. The DSCL refers to M2M Service Capabilities in the M2M Device. The DSCL has an DSCL identifier (ID) that identifies the DSCL, and the GSCL has an GSCL identifier (ID) that identifies the GSCL.

ETSI M2M architecture supports both device and gateway type equipment to connect to an M2M core network. For simplicity, only the word "device" is used herein to refer to a variety of electronic devices and gateway type equipment that may connect to the M2M core network, and whatever applies to the devices also applies to the gateway the equipment. The word "device" can be used herein to refer to the DSCL and/or the GSCL. Proprietary solutions have been developed for the M2M registration procedure, wherein a proprietary solution uses Transport Layer Security (TLS) for mutually authenticating the device and the network to each other.

The Internet Engineering Task Force (IETF) has developed the Extensible Authentication Protocol (EAP) and Protocol for carrying Authentication for Network Access (PANA). The EAP and PANA provide multiple distinctions compared to the TLS-based solution, including code reuse, extensibility, being lightweight, and being a better model fit.

With respect to code reuse, EAP is widely used for "network access authentication", such as with Wireless Fidelity (WiFi) networks, Wireless Interoperability for Microwave Access (WiMAX) networks, Zigbee networks, Ethernet networks, and other similar networks. PANA is used for "network access authentication" in Zigbee devices. Reusing the same components for another purpose reduces the cost of development and production of the M2M devices. With respect to extensibility, both EAP and PANA are extensible protocols and allow any authentication method to be used, unlike TLS which only allows Pre-Shared Key (PSK) and certificated-based authentication. PANA is extensible such that new payloads may be easily carried by defining new Attribute-Value-Pairs (AVPs). With respect to being lightweight, a solution using EAP and PANA support both User Datagram Protocol (UDP) based stacks and also Transmission Control Protocol (TCP) based stacks. In contrast, TLS requires a TCP based stack, hence it requires more code and processing. With respect to being a better model fit, EAP and PANA's 3-party authentication model is more suitable for the device-core-MAS systems. In contrast, TLS is based on a 2-party design and solutions based on TLS do not naturally fit into the M2M architectures. Accordingly, there is a need for an EAP and PANA based M2M service registration procedure FIG. 3 depicts a high-level call flow for service registration procedure according to an exemplary embodiment of the present invention.

Figure 3:
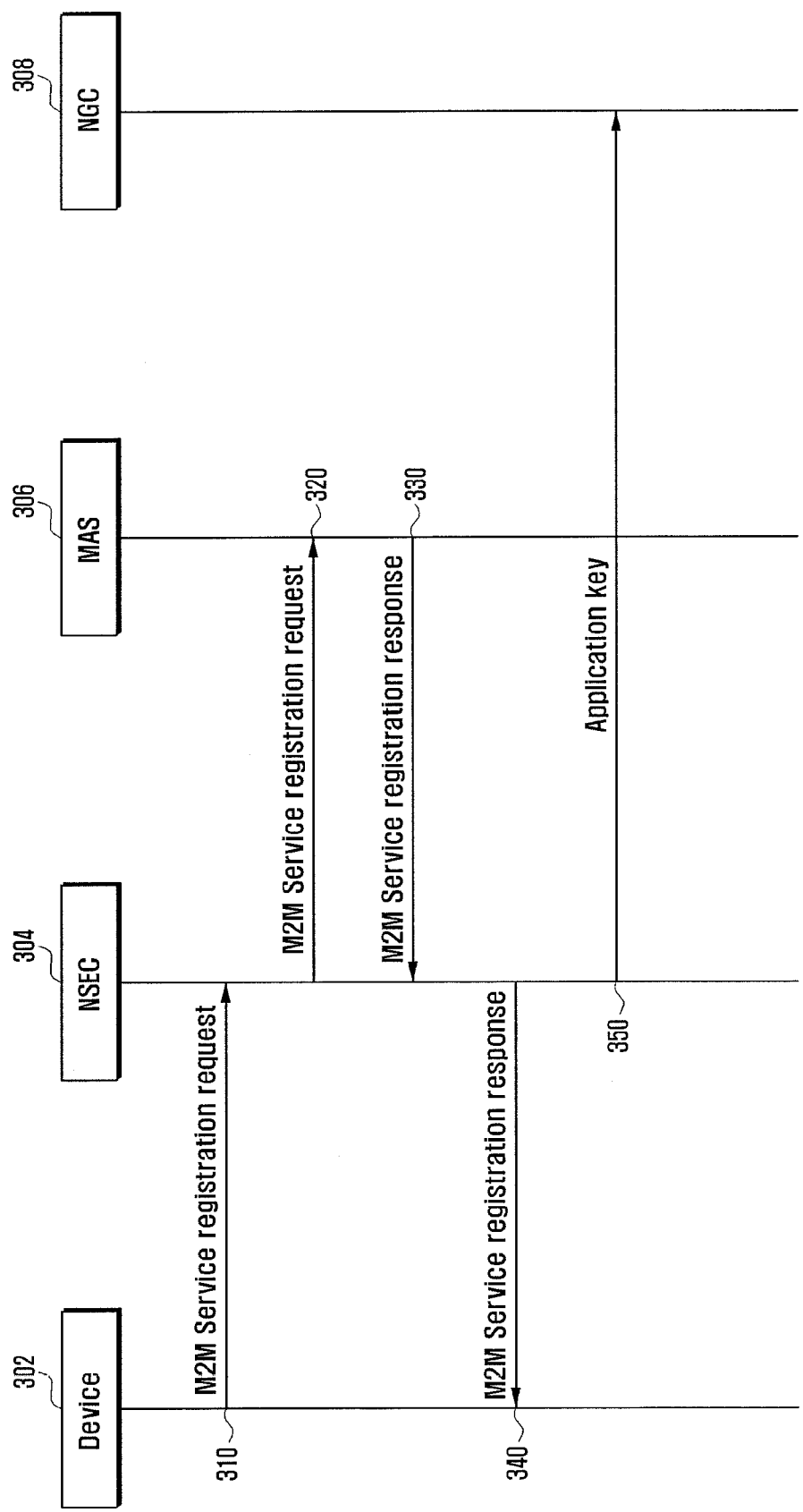
FIG. 3 depicts a high-level call flow for service registration procedure according to an exemplary embodiment of the present invention.

Referring to FIG. 3, an existing Protocol for carrying Authentication for Network Access (PANA) session is used between a device 302 and a Network Security Capability (NSEC) 304, and is the PANA session that was generated at the time of a bootstrapping procedure. The NSEC 304 and a Network Generic Communication Capability (NGC) 308 are functional elements that reside in an Machine-to-Machine (M2M) core network. The NSEC 304 is used as authenticator, and the NGC 308 is used for application-layer security.

At step 310 the device 302 sends a service registration request to the NSEC 304. The service registration request is a PANA notification request message is used for this step. An Attribute Value Pair (AVP) may be included in the PANA notification request message. More particularly, an M2M service registration request may be used for indicating details of the service registration with the M2M core network. Zero, one, or more such AVPs may be included in one message. Value fields of the AVP include the below described data elements. However, the present invention is not limited thereto and other data elements may also be included. Zero, one, or more instances of each data element may be included in the AVP.

The data elements include an assigned device Identification (ID), a network Identification (ID), an application ID, a lifetime indicator, and a key index. The assigned device ID is a device identifier that identifies the device 302 performing the registration procedure. The network ID is a network identifier that identifies a network being targeted for the registration. An application ID is an application identifier that identifies an application (e.g., smart metering, air-conditioner controller, etc.) that will be used after the registration. A lifetime indicator is a value for a lifetime requested for the registration. —A key index is an index to be used for keys generated as part of the registration procedure, including a secret key KS) and an application key (KA). The key index may also be assigned by the network, in which case the key index will not appear in the M2M service registration request, but it will appear in an M2M service registration response.

NSEC 304 authenticates the M2M service registration request. Because there is an established PANA session between the end-points, NSEC 304 may use an associated PANA security association for the authentication procedure. If the message passes the authentication procedure, then the NSEC 304 proceeds to step 320. Otherwise, the message is dropped.

At step 320, the NSEC 304 sends a service registration request to an M2M Authentication Server (MAS) 306. The NSEC 304 forwards the service registration request to the MAS 306 as an AAA (Authentication, Authorization, and Accounting) request message. Either the PANA M2M service registration request AVP is carried as-is over the AAA protocol, or its data content is imported into a AAA-specific attribute and carried as such.

The MAS 306 authorizes the PANA M2M service registration request. The result of the authorization is carried over the M2M service registration response message as described in step 330. At step 330, the NSEC 304 receives the M2M service registration response from the MAS 306. The MAS 306 sends the M2M service registration response back to the NSEC 304. The M2M service registration response also includes as service key $K_S$. The $K_S$ is calculated by both the device 302 and the MAS 306 by using the following formula, wherein the $K_S$ is a child key of a key $K_R$.

$$K_S = \text{Hash}(K_R, \text{constant\_string}|\text{Assigned-Service-ID}|\text{Network-ID}|\text{Key-index}|\text{other\_parameters})$$

Wherein, Hash is a one-way keyed hash function, such as a Hash-Based Message Authentication Code (HMAC)-Secure Hash Algorithm 1 (SHA1), HMAC-SHA256, or other similar hash functions; $K_R$ is a root key generated at the bootstrap procedure or pre-provisioned; constant_string is a constant string value, such as "M2M service key" and the string may contain one or more NULL characters ("\0"); Assigned-Service-ID is a value of the service identifier assigned by the network; Network-ID is the network identifier; Key-Index is the key index that is delivered during step 310 or during step 340; and other_parameters are the zero or more parameters that may be added to a variation of this formula. Key-index is used as the index for this key.

The MAS 306 delivers the KS and Key-index to the NSEC 304 in step 330. At step 340 the device 302 receives the M2M service registration response from the NSEC 304, as the PANA-Notification-Answer message.

The following AVP, according to the present exemplary embodiment, may be included in the aforementioned PANA message, which is an M2M-Service-Registration-Answer used for indicating a result of the service registration request. Zero, one, or more such AVPs may be included in the same message. A value field of the AVP includes the following data elements, wherein other data elements may also be included, or more than one of any of the below data elements may be included: Assigned-Device ID, which is a device identifier; Network ID, which is a network identifier; Assigned Service ID which is a service identifier assigned to this registration; Application-ID which is an application identifier; Result-code which indicates a result of request (e.g., denied, accepted, etc.); Lifetime, which is a lifetime granted for this registration procedure; and Key index which is an index to be used for the keys generated as part of this registration procedure ($K_S$ and $K_A$).

Next, at step 350, NSEC 304 generates an application key and delivers it to the NGC 308. Both the NSEC 304 and the device 302 compute the KAs using the following formula:

$$K_A = \text{Hash}(K_S, \text{constant\_string}|\text{Application-ID}|\text{other\_parameters})$$

Wherein, Hash is a one-way keyed hash function, such as HMAC-SHA1, HMAC-SHA256; $K_S$ is the service key generated/delivered earlier; constant string is a constant string value, such as "M2M application key" that may contain one or more NULL characters ("\0"); Application-ID is the value of the application identifier; other_parameters are the zero or more parameters that may be added to a variation of this formula; Key-index is used as the index for this key; and Assigned-Device-ID, Network-ID, Service-ID(s), Application-ID(s), Lifetime(s), $K_A$(s) and Key-index(es) are sent from NSEC 304 to the NGC 308. Each of the device 302, the NSEC 304, the MAS 306, and the NGC 308, may respectively include a controller for controlling and performing operations of the respective device, a transmitter for transmitting signals from the respective device, a receiver for receiving signals at the respective device, a transceiver for transmitting and receiving signals at the respective device, and a key generator for generating keys.

Figure 4:
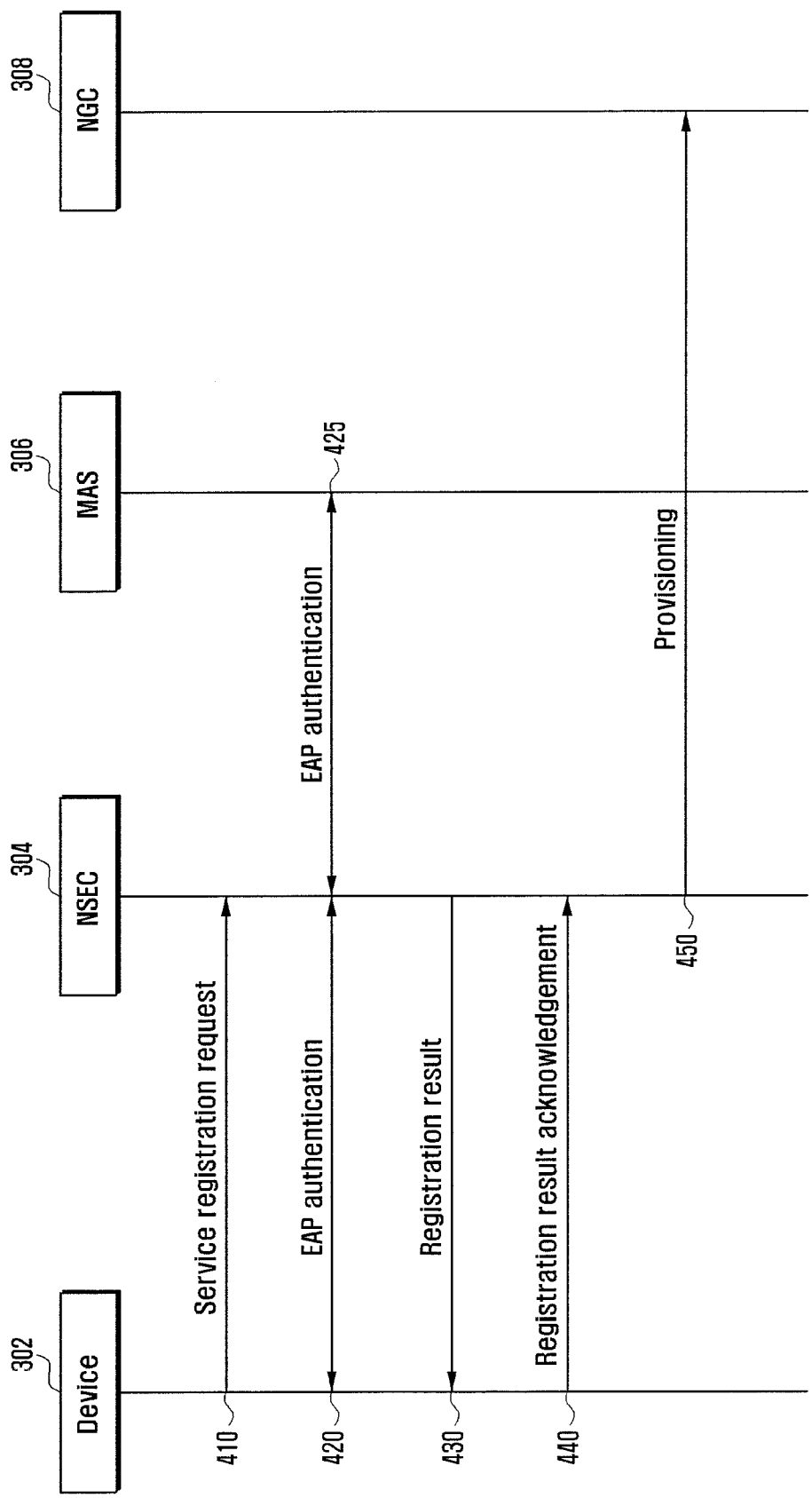
FIG. 4 depicts a high-level call flow for service registration procedure according to an exemplary embodiment of the present invention.

FIG. 4 depicts a high-level call flow for service registration procedure according to an exemplary embodiment of the present invention.

Referring to FIG. 4, a new PANA session is generated between the device 302 and the NSEC 304 using an EAP method and the $K_R$. This EAP/PANA authentication accomplishes authentication and authorization of the device 302 for M2M service registration. At step 410, the device 302 sends a service registration request to the NSEC 304. This message initiates the service registration procedure. A PANA-Client-Initiation message may be used for step 410 and includes a Usage-Type AVP where the type value is set to a value that indicates an M2M Service Registration. Also, the M2M-Service-Registration-Request AVP of FIG. 3 is to be included in this message, and has already discussed with reference to FIG. 3.

The PANA-Client-Initiation message includes the following fields: a Usage-type for indicating a purpose of the PANA session; a value field of the AVP, which includes the following data elements: a type, which is an enumerated value indicating a usage type, for example, 0 for network access, 1 for M2M bootstrapping, and 2 for M2M service registration; and a Key-index AVP, which is an index to be used for the keys generated as part of this procedure ($K_S$ and $K_A$) and the Key-index AVP may also be assigned by the network, in which case this parameter will not appear in step 410, but will appear in step 440.

In response to the PANA-Client-Initiation message, the NSEC 304 proceeds to step 420. At step 420 and step 425, the device 302, the NSEC 304 and the MAS 306 perform EAP authentication. In steps 420 and 425, an EAP method is executed between the device 302 and the MAS 306 via the NSEC 304. This EAP method utilizes the $K_R$ as a shared secret key between the device 302 and the MAS 306 for mutual authentication.

Steps 420 and 425 may involve multiple round-trip messaging between the end-points. An exact number of messages and the message formats are dependent on the EAP method being used. The operations and steps of the present exemplary embodiment are not dependent on the EAP method used at this phase. A protocol used for transporting the EAP between the device 302 and the NSEC 304 may be PANA, and the protocol used for transporting EAP between the NSEC 304 and the MAS 306 can be RADIUS or Diameter, as defined by the Internet Engineering Task Force (IETF). However, the present invention is not limited thereto, and any suitable protocols may be used.

At step 430, NSEC 304 sends the registration result to the device 302. PANA-Authentication-Request with a Completion bit set, as defined by the IETF, may be used in step 430. This registration result should also include the M2M-Service-Registration-Answer AVP.

The $K_S$ is the service key generated as a result of the service registration. The $K_S$ is shared between the device 302 and the NSEC 304. It can be generated in one of three ways. First, the $K_S$ may be generated from a Master Session Key (MSK). As such, at the end of step 425, the MSK is already generated and sent from the MAS 306 to the NSEC 304. At this point, the MSK constitutes a secret key shared by the NSEC 304 and the device 302, as the EAP on the device also produces the same MSK. The MSK may be used as a seed to generate the $K_S$ according to the following formula: $K_S$=Hash(MSK, constant_string|Assigned-Service-ID|other_parameters).

In the above formula, the Hash is a one-way keyed hash function, such as HMAC-SHA1, HMAC-SHA256; the MSK is Master Session Key generated by the EAP method; the constant_string is a constant string value, such as "M2M service key", and the string may contain one or more NULL characters ("\0"); the Assigned-Service-ID is the value of the service identifier assigned to the device 302 by the network; and the other_parameters are the zero or more parameters that may be added to a variation of this formula.

As a key index, the combination of PANA Session Identifier and PANA Key-ID are used for the device 302. If the device 302 has only one service registration, then use of Key-ID alone is sufficient to index $K_S$. Alternatively, the Key-index that is delivered in step 410 or step 440 may be used as the key index.

The $K_S$ may also be generated from an Extended MSK (EMSK). At the end of step 425, the EMSK is already generated on both the device 302 and the MAS 306. At this point, the EMSK constitutes a secret key shared by the MAS 306 and the device 302. This EMSK may be used as a seed to generate the $K_S$ according to the following formula: $K_S$=Hash (EMSK, constant_string|Assigned-Service-ID|other_parameters).

$K_S$ is generated by both the device 302 and the MAS 306. The MAS 306 delivers the $K_S$ to the NSEC 304 using RADIUS or Diameter at the end of step 425. The Key-index can be used as the key index or, alternatively, the following formula can be used for computing the key index:

Key-index=Hash($K_S$, constant_string|other_parameters), wherein, Hash is a one-way keyed hash function, such as HMAC-SHA1, HMAC-SHA256, constant_string is a constant string value, such as "Key index for Ks" and may contain one or more NULL characters ("\0"), and other_parameters are the zero or more parameters that may be added to a variation of this formula.

The $K_S$ may also be generated from $K_R$, such that $K_S$ is a child key of $K_R$, and it is computed according to the following formula:

$K_S$=Hash($K_R$,constant_string|Assigned-Service-ID|Network-ID|Key-index|other_parameters), wherein, Hash is a one-way keyed hash function, such as HMAC-SHA1, HMAC-SHA256; $K_R$ is the root key generated at the bootstrap procedure or pre-provisioned earlier; constant_string is a constant string value, such as "M2M service key", and may contain one or more NULL characters ("\0"); Assigned-Service-ID is the value of the service identifier assigned by the network; Network-ID is the network identifier; Key-Index is the key index that is delivered during step 1 or step 4; other_parameters are the zero or more parameters that may be added to a variation of this formula; and Key-index is used as the index for this key.

In such a case, the $K_S$ is generated by both the device 302 and the MAS 306. The MAS 306 delivers this key to the NSEC 304 using RADIUS or Diameter at the end of step 425.

$K_A$ is the application key generated from KS after the service registration. Both the NSEC 304 and the device 302 compute the application key(s) using the following formula:

$K_A$=Hash($K_S$,constant_string|Application-ID|other_parameters), wherein Hash is a one-way keyed hash function, such as HMAC-SHA1, HMAC-SHA256; $K_S$ is the service key generated/delivered earlier; constant_string is a constant string value, such as "M2M application key", and may contain one or more NULL characters ("\0"); Application-ID is the value of the application identifier; other_parameters are the zero or more parameters that may be added to a variation of this formula; and Key-index is used as the index for this key.

At step 440, the device 302 sends the registration result acknowledgement to NSEC 304. The device 302 sends back an acknowledgement for the registration result. A PANA-Authentication-Answer message may be used here. Next, at step 450, the NSEC 304 provisions the NGC 308 and Assigned-Device-ID, Network-ID, Service-ID(s), Application-ID(s), Lifetime(s), $K_A$(s) and Key-index(es) are sent from the NSEC 304 to the NGC 308.

Figure 5:
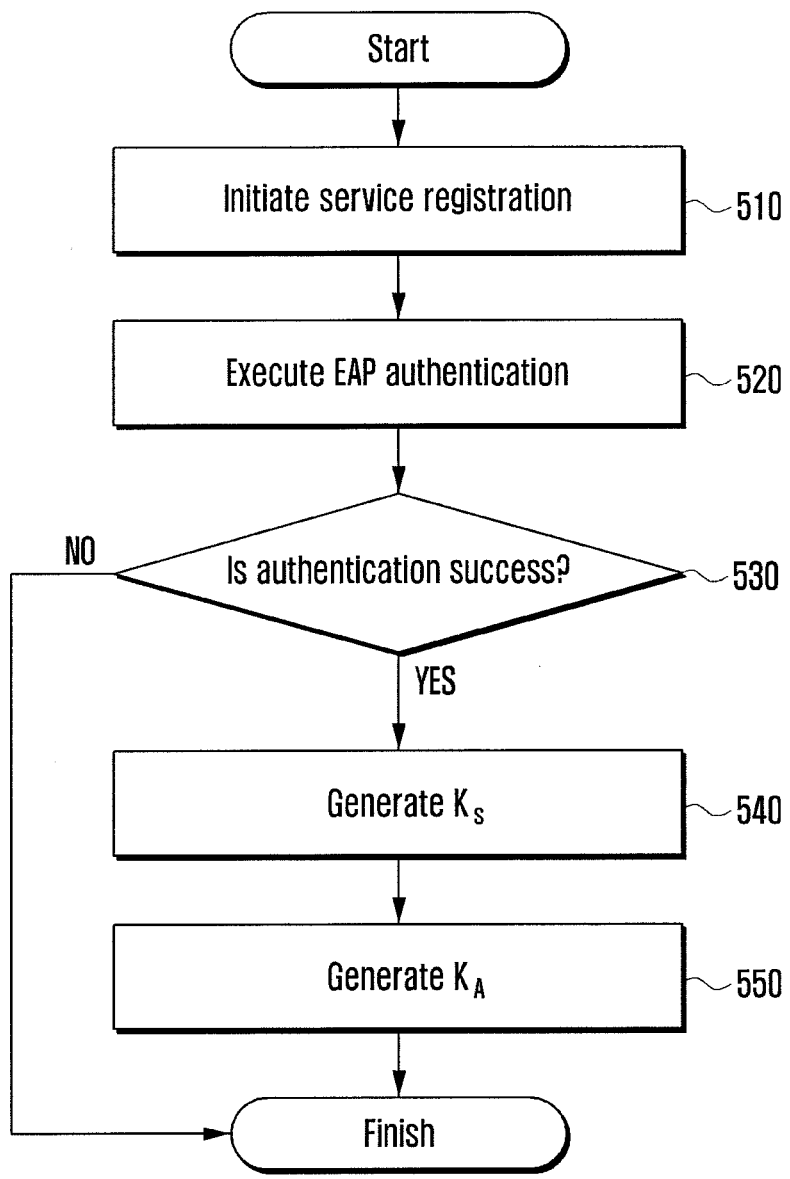
FIG. 5 depicts a flowchart for service registration procedure of the device 302 according to an exemplary embodiment of the present invention.

FIG. 5 depicts a flowchart for service registration procedure of the device 302 according to an exemplary embodiment of the present invention.

Referring to FIG. 5, at step 510, the device 302 initiates the service registration. For example, the device 302 transmits the service registration request to the NSEC 304. Next, at step 520, the device 302 executes the EAP authentication with the NSEC 304 and/or the MAS 306. The device 302 may perform the EAP authentication according to the exemplary embodiments of FIG. 3 or 4.

At step 530, the device 302 determines whether the authentication is successful. If the authentication is not successful, the process terminates. Otherwise, the process moves to step 540. At step 540, the device 302 generates the $K_S$. At step 550, the device 302 generates the $K_A$. The device 302 may generate the $K_S$ and the $K_A$ according to the exemplary embodiments of FIGS. 3 and 4.

Figure 6:
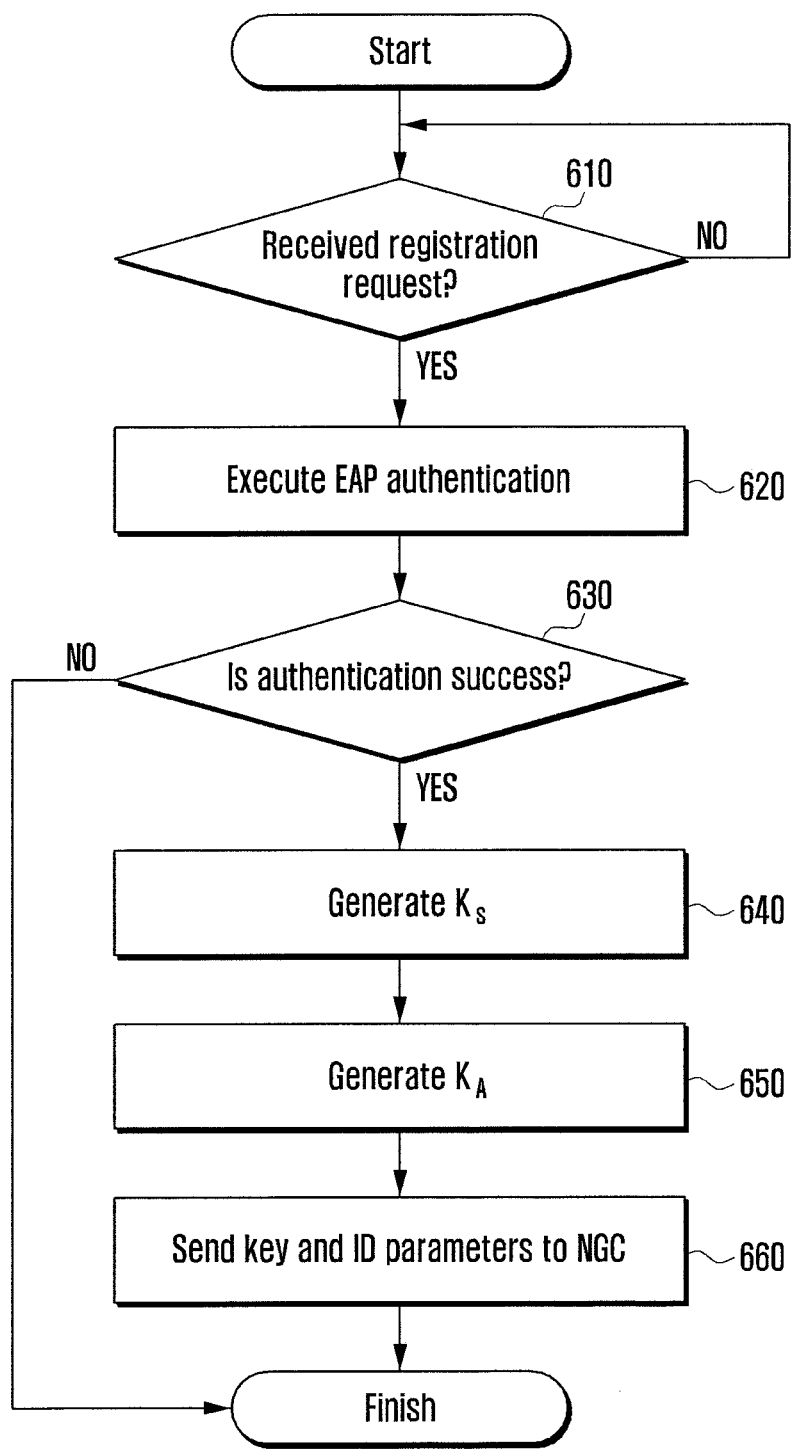
FIG. 6 depicts a flowchart for service registration procedure of NSEC 304 according to an exemplary embodiment of the present invention.

FIG. 6 depicts a flowchart for service registration procedure of a NSEC according to an exemplary embodiment of the present invention.

Referring to FIG. 6, at step 610, the NSEC 304 determines whether the service registration request is received. If the NSEC 304 has not received the service registration request, then the NSEC 304 waits until the service registration request is received. If the NSEC 304 has received the service registration request, then the process moves to step 620.

At step 620, the NSEC 304 executes EAP authentication with the device 302 and/or the MAS 306. The NSEC 304 may perform EAP authentication according to the exemplary embodiments of FIGS. 3 and 4. Next, at step 630, the NSEC 304 determines whether the authentication is successful. If the authentication is not successful, then the process terminates, otherwise, the process moves to step 640. At step 640, the NSEC 304 generates the $K_S$. At step 650, the NSEC 304 generates the $K_A$. The NSEC 304 may generate the $K_S$ and the $K_A$ according to the exemplary embodiments of FIGS. 3 and 4. At step 660, the NSEC 304 transmits the generated key(s) and/or ID parameters to the NGC 308.

Figure 7:
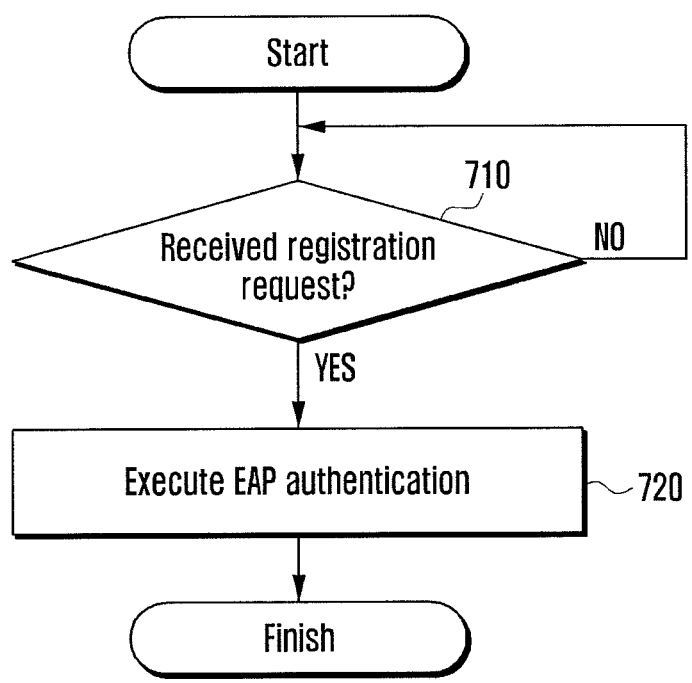
FIG. 7 depicts a flowchart for service registration procedure of an M2M Authentication Server (MAS) according to an exemplary embodiment of the present invention.

FIG. 7 depicts a flowchart for service registration procedure of MAS 306 according to an embodiment of the present invention.

Referring to FIG. 7, at step 710, the MAS 306 determines whether the service registration request is received. If the MAS 306 has not received the service registration request, then the MAS 306 waits until the service registration request is received. If the MAS 306 has received the service registration request, then the process moves to step 720. At step 720, the MAS 306 executes EAP authentication with the device 302 and/or the NSEC 304. The MAS 306 may perform EAP authentication according to the exemplary embodiments of FIGS. 3 and 4.

Figure 8:
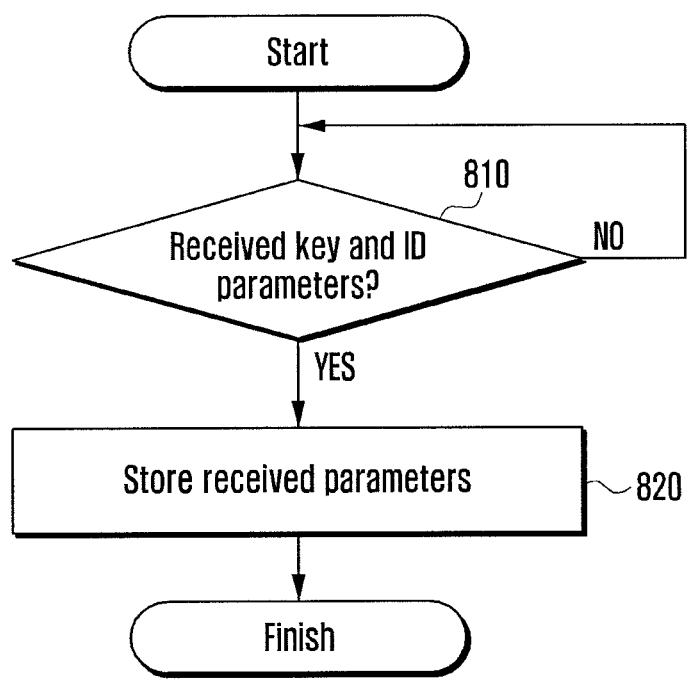
FIG. 8 depicts the flowchart for service registration procedure of NGC 308 according to an exemplary embodiment of the present invention.

FIG. 8 depicts a flowchart for service registration procedure of NGC 308 according to an exemplary embodiment of the present invention.

Referring to FIG. 8, at step 810, the NGC 308 determines whether the key(s) and ID parameters are received. If the MAS 306 has not received the key and ID parameters, then the NGC 308 waits until the service registration request is received. If the NGC 308 has received the key and ID parameters, then the process moves to step 820. At step 820, the NGC 308 stores the received key(s) and ID parameters.

Since computer program instructions may be mounted in a processor of a general computer, a special computer, or other programmable data processing equipment, instructions performed through a processor of a computer or other programmable data processing equipment generates means for performing functions described in block(s) of the flowcharts. Since the computer program instructions may be stored in a computer or computer readable memory capable of orienting a computer or other programmable data processing equipment to implement functions in a specific scheme, instructions stored in the computer or computer readable memory may produce manufacturing articles involving an instruction means executing functions described in block(s) of the flowcharts. Because the computer program instructions may be mounted on a computer or other programmable data processing equipment, a series of operation steps are performed in the computer or other programmable data processing equipment to create a process executed by the computer such that instructions performed by the computer or other programmable data processing equipment may provide steps for executing functions described in block(s) of the flowcharts.

Further, each block may indicate a part of a module, a segment, or a code including at least one executable instruction for executing specific logical function(s). It should be noted that several execution examples may generate functions described in blocks out of order. For example, two continuously shown blocks may be simultaneously performed, and the blocks may be performed in a converse order according to corresponding functions.

As used herein, the term "unit" refers to software or a hardware structural element such as a Field Programmable Gate Array (FPGA) or an Application Specific Integrated Circuit (ASIC), and the "unit" perform some roles. However, the "unit" is not limited to software or hardware. The "unit" can be configured to be stored in an addressable storage medium and to play at least one processor. Accordingly, for example, the "unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "units" may be engaged by the smaller number of structural elements and "units", or may be divided by additional structural elements and "units". Furthermore, structural elements and "units" may be implemented to play a device or at least one CPU in a security multimedia card.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing service for a machine-to-machine (M2M) device, the method comprising:
transmitting, a request for service to a network entity providing a security capability;
performing an authentication with an M2M authentication server (MAS) via the network entity;
generating, if the authentication is successful, a service key based on a master session key (MSK), a first constant string, and an identification associated with the M2M device;
transmitting a message indicating registration result acknowledgement to the network entity, comprising a value for a lifetime requested for the registration; and
generating an application key based on the service key, a second constant string, and an application identification (ID).

2. The method of claim 1, wherein the performing of the authentication comprises communicating, for the authentication with the network entity, by using a protocol for carrying authentication for network access (PANA).

3. The method of claim 1, wherein the request for service is a PANA-Client-Initiation (PCI) packet.

4. The method of claim 1, wherein the request for service comprises information for identifying at least one component of the M2M device.

5. The method of claim 4, wherein the at least one component comprises a device security capability layer (DSCL).

6. The method of claim 1, wherein the request for service comprises an identification of a device security capability layer (DSCL).

7. The method of claim 1, further comprising receiving an identification for service from one of the network entity and the MAS.

8. The method of claim 7, wherein the service key is generated based on further the identification for service.

9. A machine-to-machine (M2M) device, the M2M device comprising:
a transceiver configured to transmit a request for service to a network entity providing a security capability; and
a controller configured:
to control performing an authentication with an M2M authentication server (MAS) via the network entity,
to generate, if the authentication is successful, a service key based on a master session key (MSK), a first constant string, and an identification associated with the M2M device,
to transmit a message indicating registration result acknowledgement to the network entity, comprising a value for a lifetime requested for the registration, and
to generate an application key based on the service key, a second constant string, and an application identification (ID).

10. The M2M device of claim 9, wherein the transceiver is further configured to communicate with the network entity, during the authentication with the network entity, by using a protocol for carrying authentication for network access (PANA).

11. The M2M device of claim 9, wherein the request for service is a PANA-Client-Initiation (PCI) packet.

12. The M2M device of claim 9, wherein the request for service comprises information for identifying at least one component of the M2M device.

13. The M2M device of claim 12, wherein the at least one component comprises a device security capability layer (DSCL).

14. The M2M device of claim 9, wherein the request for service comprises an identification of a device security capability layer (DSCL).

15. The M2M device of claim 9, further comprising a transceiver configured to receive an identification for service from one of the network entity and the MAS.

16. The M2M device of claim 15, wherein the service key is generated based on further the identification for service.

17. A method of providing service by a network entity providing a security capability in a network system, the method comprising:
receiving a request for service from a machine-to-machine (M2M) device;
performing an authentication with the M2M device and an M2M authentication server (MAS);
generating, if the authentication is successful, a service key based on a master session key (MSK), a first constant string, and an identification associated with the M2M device;
transmitting a message indicating registration result acknowledgement to the MAS, comprising a value for a lifetime requested for the registration; and
generating an application key based on the service key, a second constant string, and an application identification (ID).

18. The method of claim 17, wherein the performing of the authentication comprises communicating, for the authentication with the M2M device, by using a protocol for carrying authentication for network access (PANA); and
communicating, for the authentication with the MAS, by using an authentication, authorization and accounting (AAA) protocol.

19. The method of claim 17, wherein the request for service is a PANA-Client-Initiation (PCI) packet.

20. The method of claim 17, wherein the request for service comprises information for identifying at least one component of the M2M device.

21. The method of claim 20, wherein the at least one component comprises a device security capability layer (DSCL).

22. The method of claim 17, wherein the request for service comprises an identification of a device security capability layer (DSCL).

23. A network entity for providing service in a Machine-to-Machine (M2M) system, the network entity comprising:
a transceiver configured to receive a request for service from a M2M device; and
a controller configured:
to control performing an authentication with the M2M device and an M2M authentication server (MAS),
to generate, if the authentication is successful, a service key based on a master session key (MSK), a first constant string, and an identification associated with the M2M device,
to transmit a message indicating registration result acknowledgement to the MAS, comprising a value for a lifetime requested for the registration, and
to generate an application key based on the service key, a second constant string, and an application identification (ID).

24. The network entity of claim 23, wherein the transceiver is further configured to communicate during the authentication with the M2M device, by using a protocol for carrying authentication for network access (PANA), and to communicate, during the authentication with the MAS, by using an authentication, authorization and accounting (AAA) protocol.

25. The network entity of claim 23, wherein the request for service is a PANA-Client-Initiation (PCI) packet.

26. The network entity of claim 23, wherein the request for service comprises information for identifying at least one component of the M2M device.

27. The network entity of claim 26, wherein the at least one component comprises a device security capability layer (DSCL).

28. The network entity of claim 23, wherein the request for service comprises the identification of a device security capability layer (DSCL).

* * * * *